(12) United States Patent
Richter et al.

(10) Patent No.: US 11,137,823 B1
(45) Date of Patent: Oct. 5, 2021

(54) SYSTEMS AND METHODS FOR POWER MANAGEMENT IN A DATA STORAGE DEVICE

(71) Applicant: Western Digital Technologies, Inc., San Jose, CA (US)

(72) Inventors: Elkana Richter, Tene (IL); Shay Benisty, Beer Sheva (IL); Nissim Elmaleh, Meitar (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 22 days.

(21) Appl. No.: 16/879,595

(22) Filed: May 20, 2020

(51) Int. Cl.
| | |
|---|---|
| *G06F 1/3296* | (2019.01) |
| *G06F 1/3234* | (2019.01) |
| *G06F 13/42* | (2006.01) |
| *G06F 11/30* | (2006.01) |
| *G06F 1/08* | (2006.01) |

(52) U.S. Cl.
CPC .............. *G06F 1/3296* (2013.01); *G06F 1/08* (2013.01); *G06F 1/3253* (2013.01); *G06F 11/3062* (2013.01); *G06F 13/4221* (2013.01); *G06F 2213/0026* (2013.01)

(58) Field of Classification Search
CPC ........ G06F 1/3296; G06F 1/08; G06F 1/3253; G06F 11/3062; G06F 13/4221
USPC ....................................................... 713/300
See application file for complete search history.

(56) References Cited

U.S. PATENT DOCUMENTS

| | | | | |
|---|---|---|---|---|
| 5,754,557 | A * | 5/1998 | Andrewartha | G11C 11/406 714/30 |
| 2018/0150125 | A1* | 5/2018 | HomChaudhuri | G06F 1/3287 |
| 2020/0278733 | A1* | 9/2020 | Li | G06F 1/28 |

OTHER PUBLICATIONS

John Edwards "4 causes of SSD failure and how to deal with them", Published Mar. 19, 2020 https://searchstorage.techtarget.com/tip/4-causes-of-SSD-failure-and-how-to-deal-with-them, 4 pages.
Justin Meza, "Large Scale Studies of Memory, Storage, and Network Failures in a Modern Data Center," arXiv: 1901.03401v1, Jan. 1, 2019, https://arxiv.org/pdf/1901.03401.pdf, 180 pages.
Pradeep Subedi, Exploration of Erasure-Coded Storage Systems for High Performance, REliability, and Inter-operability, Virginia Commonweath University, Theses and Dissertations, 2016, 131 pages.
PCT/US2020/006426, International Search Report and Written Opinion, dated Mar. 4, 2021, 9 pages.
Israel Patent Office, PCT/US2020/066426, Search Strategy, dated Feb. 8, 2021, 3 pages.

* cited by examiner

*Primary Examiner* — Paul R. Myers
(74) *Attorney, Agent, or Firm* — Patterson & Sheridan LLP; Steven H. Versteeg (57) ABSTRACT

The present disclosure describes methods and systems for data storage or other devices that are L1 sub-state capable, to be able to enter these sub-states while on the same network or bus as a device not enabled for transition to an L1 sub-state. In some embodiments, when an LTSSM circuit in a MAC of a PCIe device indicates an L1 idle state, an L1 sub-state (L1SS) timer is initiated in a CLKREQ on the device. Upon expiration of the timer, a CLKREQ_in emulator de-asserts its signal on the MAC, causing the MAC to enter an L1SS.

20 Claims, 8 Drawing Sheets

SYSTEMS AND METHODS FOR POWER MANAGEMENT IN A DATA STORAGE DEVICE

BACKGROUND OF THE DISCLOSURE

Field of the Disclosure

Embodiments of the present disclosure generally relate to regulation of power consumption of a computer peripheral device, and more particularly to enabling low-power sub states in a computer device.

Description of the Related Art

Although smaller CMOS geometries enable designers to reduce active power of devices, these same geometries have increased leakage current that impact a device's idle power consumption, especially in mobile devices. To address such issues, hardware standards have been improved, in standards such as PCIe, to include low power states. L0 is the representation of the power state of an active device or component, with L1, L2, and L3 representing lower power states for devices in idle states.

Of these low power states, L1 has the fastest recovery time to transition a device to the L0, or active state. L2 and L3 require substantially longer to transition to L0, sometimes measured in milliseconds, considered to be too long for mobile devices and high performance computing. As a result, the PCIe standard has been changed to include additional L1 power states—L1.1 and L1.2 sub-states. These sub-states consume far less power than the L1 state, and can be brought back to the L0 state much faster than the L2 and L3 states.

However, adoption of the L1 power sub-states is not common to all devices. If all endpoint devices on a common PCIe network do not have the L1 power sub-states enabled, under current approaches, no device on that network can transition to an L1.1 or L1.2 power sub-state. As a result, all devices on such a network continue to consume relatively large amounts of power in the L1 power state, and are unable to take advantage of the far lower power requirements capable at the L1 power sub-states.

Accordingly, what is needed are methods and systems that enable PCIe end point devices on a common network to transition to power saving L1 power sub-states, even if all devices on that network are not configured for such a transition.

SUMMARY OF THE DISCLOSURE

The present disclosure describes methods and systems for PCIe devices that are L1 sub-state capable, to be able to enter these sub-states while on the same network or bus as an L1 device not enabled for transition to an L1 sub-state. In some embodiments, when an LTSSM circuit in a MAC of a PCIe device indicates an L1 idle state, an L1 sub-state (L1SS) timer is initiated in a CLKREQ emulator on the PCIe device. Upon expiration of the timer, a CLKREQ_in emulator de-asserts its signal on the MAC, causing the MAC to enter an L1SS.

In one embodiment, a data storage device including one or more memory devices, a CLKREQ emulator, a MAC coupled to the CLKREQ emulator, and a controller coupled to one or more memory devices. The controller is configured to cause the MAC to receive a signal from the CLKREQ emulator, cause the MAC to enter an L1 power sub-state, and cause the signal to the CLKREQ emulator from the MAC to be de-asserted.

In another embodiment, a data storage device including one or more memory devices, a CLKREQ emulator, a MAC, a PHY that includes a signal detect circuit, and a controller coupled to one or more memory devices. The controller is configured to cause a signal to be asserted to the signal detect circuit, detect a low power state of the MAC, cause the signal detect circuit to assert a signal to the CLKREQ emulator, and cause the MAC to exit the lower power state, by causing the CLKREQ emulator to assert a signal to the MAC.

In another embodiment, a system for reducing power consumption in a device that includes a means for detecting a transmission to a PCIE device, a MAC on the PCIE device, coupled to the means for detecting a signal, and a means for determining a state of the PCIE device, coupled to the MAC, wherein the means for determining the state of the PCIE device instructs the MAC to enter a first low power state upon detecting no transmissions to the PCIE device after a period of time. The system further includes a CLKREQ coupled to the MAC, where the CLKREQ is configured to assert a signal to the MAC, and after the first low power state is entered, de-assert the signal to the MAC, where the MAC is configured to enter a second low power state upon de-assert of the signal.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure describes methods and systems for PCIe devices that are L1 sub-state capable, to be able to enter these sub-states while on the same network or bus as an L1 device not enabled for transition to an L1 sub-state. In some embodiments, when an LTSSM circuit in a MAC of a PCIe device indicates an L1 idle state, an L1 sub-state (L1SS) timer is initiated in a CLKREQ emulator on the PCIe device. Upon expiration of the timer, a CLKREQ_in emulator de-asserts its signal on the MAC, causing the MAC to enter an L1SS. In embodiments, the CLKREQ emulator may be a CLKREQ (i.e., not emulated), or other method, system, or means capable of providing and/or receiving a clock request signal.

Figure 1:
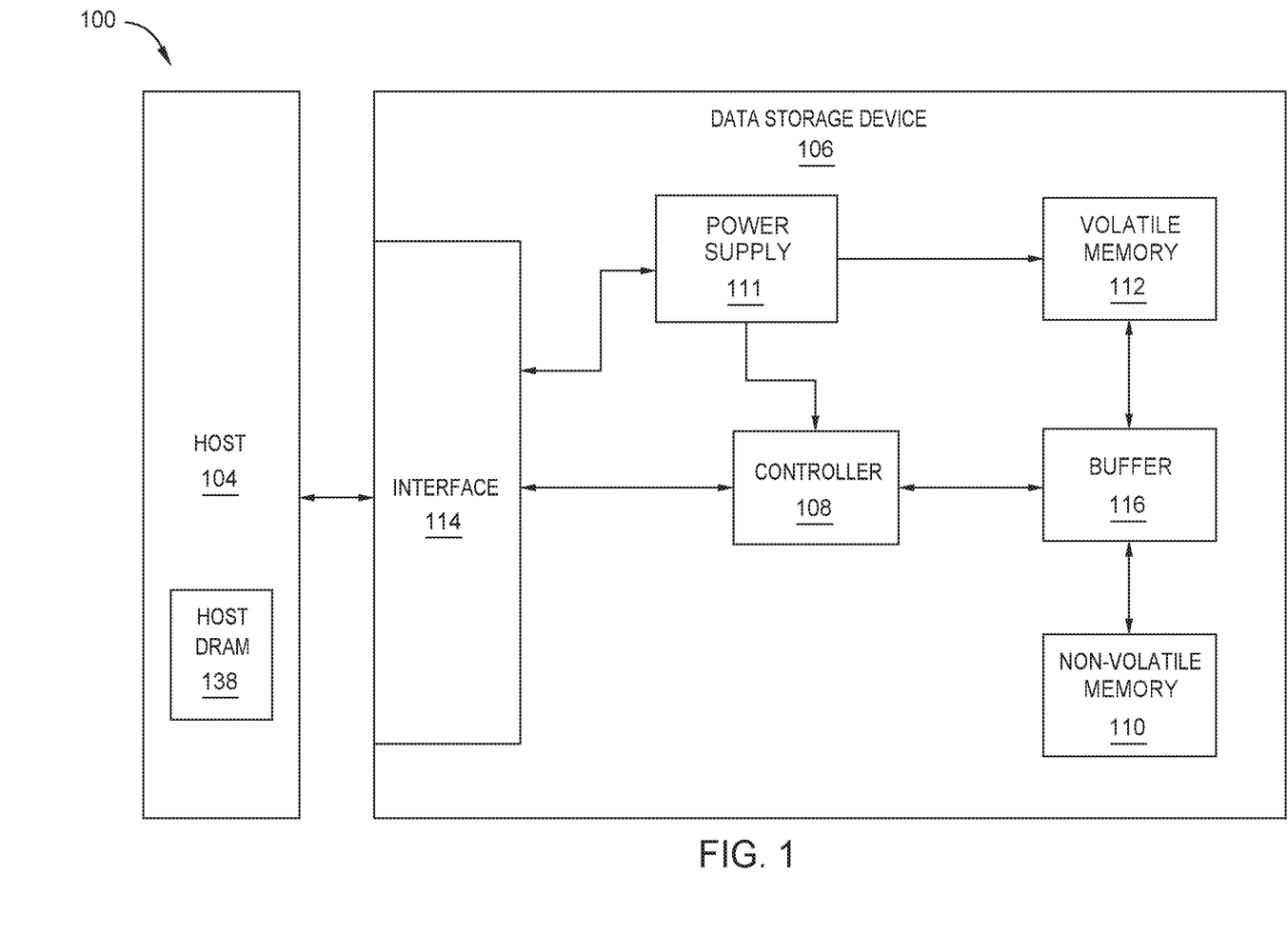
FIG. 1 is a schematic illustration of a computing system including a host device and a storage device, according to disclosed embodiments.

FIG. 1 is a schematic block diagram illustrating a storage system 100 in which data storage device 106 may function as a storage device for a host device 104, in accordance with one or more techniques of this disclosure. For instance, the host device 104 may utilize non-volatile memory devices 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, an interface 114, and a buffer 116. The controller 108 comprises an internal memory or buffer 116. In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like.

The electrical connection of the interface 114 (e.g., the data bus, the control bus, or both) is electrically connected to the controller 108, providing electrical connection between the host device 104 and the controller 108, allowing data to be exchanged between the host device 104 and the controller 108. The interface 114 may be a type of connection unit to transfer data to the data storage device 106 from the host device 104, and vice-versa. Such connection units may be a USB-A connection, a USB-B connection, a mini USB-A connection, a mini USB-B connection, a micro USB-A connection, a micro USB-B connection, a USB-C connection, or a lightning connection. The connection unit may comprise of several pins with a specialized usage. Furthermore, connection units are utilized for various purposes such as isochronous transfers, interrupt transfers, and bulk transfers. The term "bulk transfers" refers to large sporadic transfers using all remaining available bandwidth, but with no guarantees on bandwidth or latency. Bulk transfers are utilized when transferring files or data through a connection medium such as a USB cable. However, other methods of transferring data are available and the use of the term "USB cable" is not intended to be limiting.

For example, a USB-A connection has 4 pins. Each pin is utilized for a specific purpose, such as a supply voltage pin, a data (−) pin, a data (+) pin, and a supply voltage ground pin. Other connection units may have more than or less than 4 pins and each pin may have a different usage. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512

MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

Figure 2:
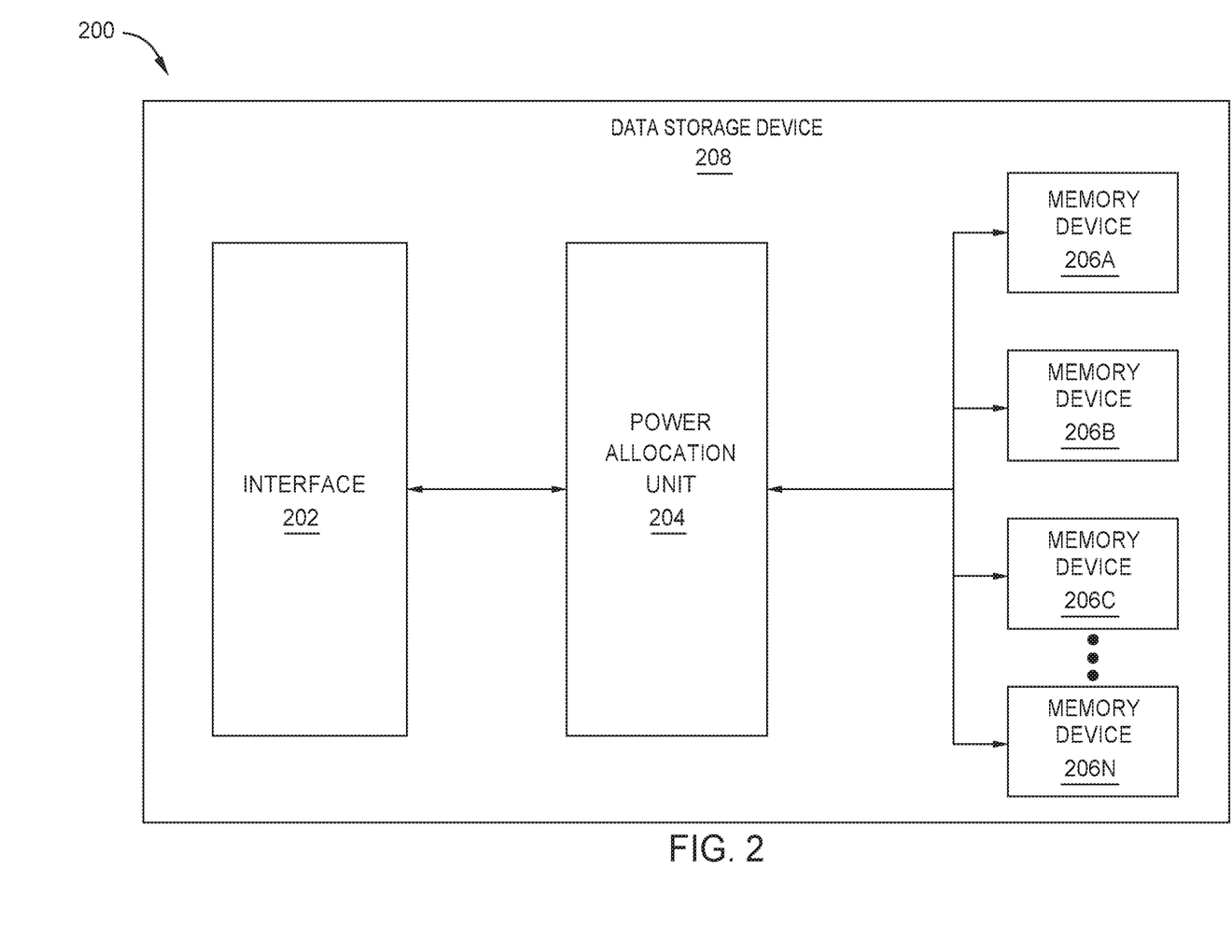
FIG. 2 is a schematic illustration of a data storage device, according to disclosed embodiments.

FIG. 2 is a schematic illustration of a data storage device 208, according to one embodiment. Data storage device 208 comprises an interface 202 and a power allocation unit (PAU) 204. The interface 202 may be the interface 114 of FIG. 1. The data storage device 208 further comprises an array of memory devices 206A-206N (collectively referred to as memory devices 206). The notation "N" refers to the last memory device of a plurality of memory devices. Furthermore, the memory devices 206 may be the non-volatile memory 110 of FIG. 1 or an NVMe storage device. Each of the memory devices 206A-206N may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.). However, the listed data storage size of the memory devices is not intended to be limiting nor restricting. Furthermore, in one embodiment, memory devices 206A-206N are the same type and have the same data storage sizes. In another embodiment, memory devices 206A-206N are different types but have the same data storage sizes. In yet another embodiment, memory devices 206A-206N are different types and have different data storage sizes.

The power allocation unit 204 may be coupled with a controller (not shown), such as the controller 108 of FIG. 1. The PAU 204 appropriates power received from the host device, such as the host device 104 of FIG. 1, to each of the memory devices 206. The controller 108 may determine the appropriate power state of each memory device 206A-206N, and the PAU 204 provides the corresponding power to each memory device 206A-206N.

The host device 104 may provide a suitable amount of power to the data storage device 208 through one or more pins on the interface 202. The suitable amount of power may be more than or equal to the amount of power the data storage device 208 requires to operate. For example, the power a data storage device 208 may receive from the host device 104 may be about 5 W. Furthermore, a data storage device 208 may draw out about 500 mW to about 15 W of power from the host device 104. The previously mentioned values for power are not intended to be limiting, but to provide a reference.

Figure 3:
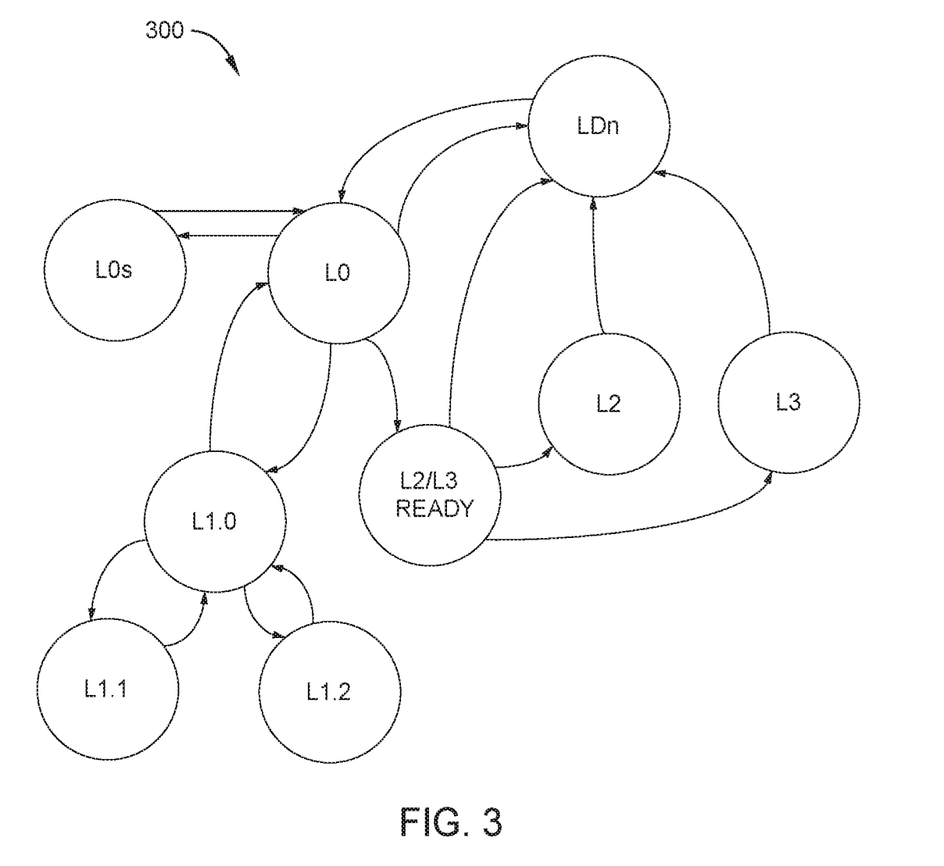
FIG. 3 depicts a link power management flow diagram, according to disclosed embodiments.

FIG. 3 depicts a link power management flow diagram 300, according to disclosed embodiments. A link training and status state machine (LTSSM) transitions the device, such as the storage device 208 of FIG. 2, to a different power state by utilizing a PAU, such as the PAU 204 of FIG. 2. A memory device 206A-206N may have several low power mode power states. For exemplary purposes, the low power mode power states are referred to as power states. For example, a memory device 206A-206N may have the following 5 power states: L0, L0s L1, L2, and L3. Each of the power states are associated with a distinct data storage device 208 operation. Power states L0, L0s, and L1 are considered operational power states, utilizing about 1 W to about 8 W of power, whereas Power states L2 and L3 are considered non-operational power states, utilizing about 2 mW to about 50 mW of power. An operational power state refers to the ability of a host device, such as the host device 104 of FIG. 1, to communicate with a memory device 206A-206N of a data storage device 208.

Power states are numbered sequentially, where higher numbers represent lower power requirements, due to a greater number of offline circuits, and corresponding higher exit latencies. Furthermore, each power state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the power states and exit latencies are not intended to be limiting, but to provide an example of possible embodiments.

L0 is referred to as a fully operational state, where I/O commands are enabled, and the device may generate interrupts. Interrupts are an automatic transfer of firmware execution due to a system timer or a user command. Power states L0s and L1 are also operational states; however, L0s and L1 may have a lower functionality than that of L0. For example, L0s has a similar power requirement as that of the L0, but only allows for a serial link in one direction. However, L1 allows for a bidirectional serial link and allows for a greater reduction in the power requirement, but has a higher exit latency than that of L0 and L0s. Power states L2 and L3 are non-operational power states have a power requirement less than that of the operational power states. Furthermore, memory devices 206 not used are placed in a non-operational power state, L2 and L3, to limit the idle power consumption to a minimal value.

In order for I/O commands to occur, the memory device 206A-206N is woken up and placed into either L0, L0s, or L1. The controller, such as the controller 108 of FIG. 1, utilizes the PAU 204 to change the power state of a memory device 206A-206N from the operational power states, such as L0, L0s, or L1, to a different operational power state, such as L0, L0s, or L1, or to a non-operational power state, such as L2 or L3, depending on the situation. However, in order for a memory device 206A-206N to be placed into L2 or L3, the memory device 206A-206N will need to be in power state L2/L3 ready, which is a pseudo-state to prepare the component for a loss in power and reference clock(s). However, the controller 108 utilizes the LTSSM and the PAU 204 to allocate the appropriate amount of power to return all power states L0s, L1, L2, L3 into power state L0 when a full operational state is required. For example, to return to L0 from L2 or L3, the memory device 206A-206N transitions to a transient pseudo-state, LDn, before transitioning to L0. The LDn state may be a fundamental reset state, a hot reset state, or a link disable transmission state by the upstream component (e.g., the host).

As shown in FIG. 3, the power state L1 in some embodiments includes additional sub-states, L1.1 and L1.2, where the power state L1 is referred to as L1.0. The L1 sub-states (L1SS), L1.1 and L1.2, may require more power for operation than L2 and L3; however, the L1SS utilizes less power than the L1.0 state. At an L1SS, the memory device 206A-206N remains operational and requires less power to return to a more operational state, such as L1.0 or L0, by using the LTSSM. Furthermore, the L1SS requires less time than the L2 and/or the L3 states to return to a full active power state L0.

Figure 4:
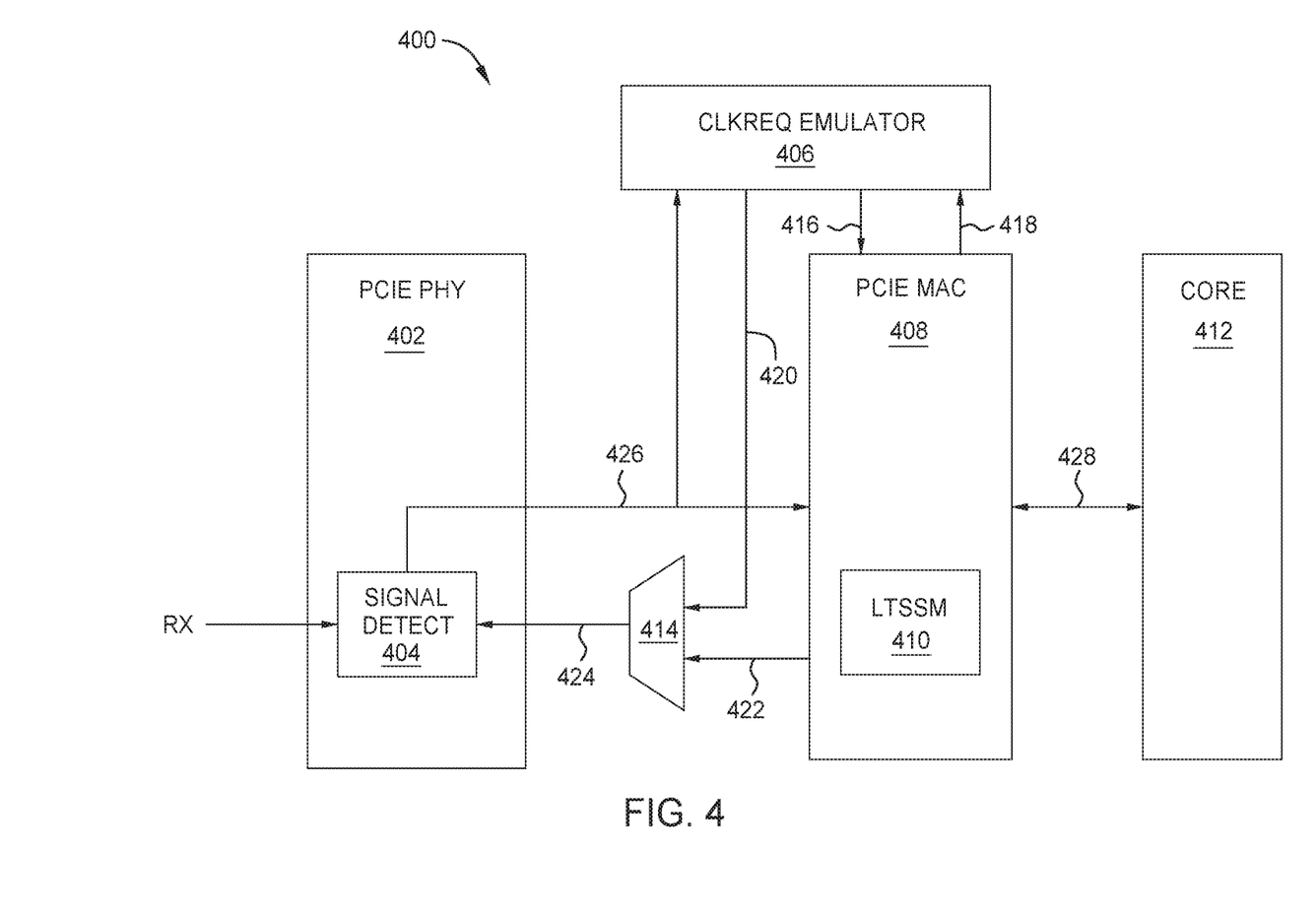
FIG. 4 depicts a schematic representation of a device capable of L1 sub-state support, according to disclosed embodiments.

FIG. 4 depicts a schematic representation of a device 400 capable of L1 sub-state support, according to disclosed embodiments. In some embodiments, one or more devices coupled to a PCIE bus that is coupled to device 400 do not support L1SS, and in further embodiments, a host composed of device 400 does not support L1SS. The device 400 includes a PCIE PHY 402, including a signal detect module 404, a CLKREQ emulator 406 (in some embodiments a CLKREQ), a PCIE MAC 408, including an LTSSM 410, a core 412, and a multiplexer 414. Communication between the multiplexer 414 and the signal detect module 404 occurs along a first circuitry 424. The signal detect module 404 transmits a signal along a second circuitry 426 to both the CLKREQ emulator 406 and the PCIE MAC 408. The signal transmitted by the signal detect module 404 may request the current link state of the CLKREQ emulator 406 and the PCIE MAC 408. The core 412 and the PCIE MAC 408 may communicate or exchange data via a toggle mode bus 428.

In order to create an environment where the link remains in a L1 state and the device 400 transitions to a L1SS, the CLKREQ emulator 406 sends a sideband signal request to the signal detect module 404. For example when the PCIE MAC 408 requests to transition to a L1SS, the CLKREQ emulator 406 receives a CLKREQ#_out signal 418 from the PCIE MAC 408. The CLKREQ emulator 406 then sends a CLKREQ#_in signal 416 to indicate to the PCIE MAC 408 to initiate the power mode transition (e.g., from L1.0 to L1.1 or L1.2).

The CLKREQ emulator 406 and the PCIE MAC 408 both sends a signal to the signal detect module 404. The PCIE MAC signal 422 indicates that the device 400 is transitioning to an L1SS and attempts to turn off the signal detect module 404. However, the CLKREQ emulator 420 sends a signal to the signal detect module 404 to request the signal detect module 404 to remain active. The PCIE MAC signal 422 and the CLKREQ emulator signal 420 enter a multiplexer 414, where the multiplexer 414 determines which signal to send to the signal detect module 404. In some embodiments, multiplexer 414 could be a logic gate (AND, NAND, OR, NOR, XOR, etc.) or combination of logic gates. The multiplexer 414, generally, determines that the CLKREQ emulator signal 420 takes priority and passes the CLKREQ emulator signal 420 to the signal detect module 404, while the PCIE MAC signal 422 is ignored. Since the CLKREQ emulator signal 420 is received by the signal detect module 404, the signal detect module 404 remains on.

When exiting a L1SS, the link partner requests to exit the L1 (L1.0) state to the L0 state. The CLKREQ emulator 406 sends a CLQREQ#_in signal 416 to the PCIE MAC 408 to exit the L1SS to the L1.0 state. At the L1.0 state, the PCIE MAC 408 sends a PCIE MAC signal 422 to the signal detect module 404 to transition the power state to L0.

Figure 5:
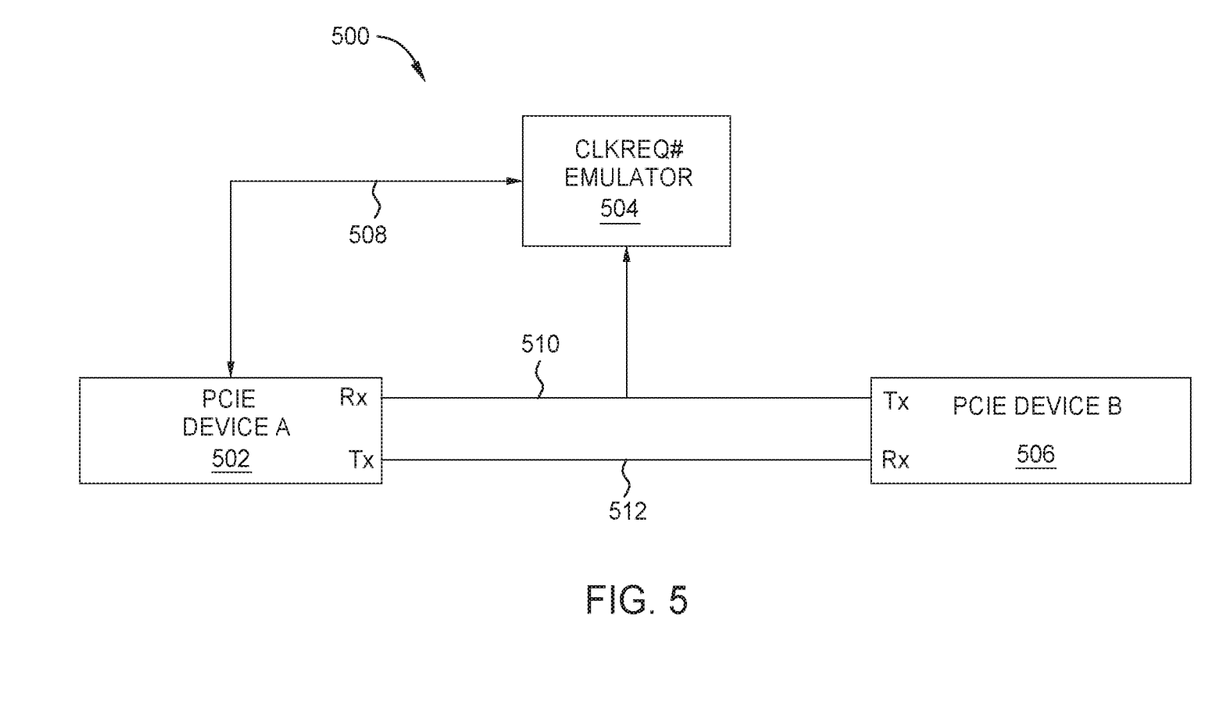
FIG. 5 depicts a system capable of L1 sub-state support, according to disclosed embodiments.

FIG. 5 depicts a system 500 capable of L1 sub-state support, according to disclosed embodiments. The system 500 includes a PCIE device A 502, a PCIE device B 506, and a CLKREQ# emulator 504. The CLKREQ# emulator 504 may the CLKREQ emulator 406 of FIG. 4. In one embodiment, the PCIE device A 502 supports L1SS, and the PCIE device B 506 does not support L1SS. The low power link is halted at the L1.0 state since one or more devices, such as the PCIE device B 506, does not support L1SS.

However, the CLKREQ# emulator 504 includes a first circuit 508 and a second circuit 510. The first circuit 508 controls the signaling of the CLKREQ# of the PCIE device A 502. The second circuit 510 detects the transmission along the Rx/Tx line, where the Rx corresponds to the PCIE device A 502 and the Tx corresponds to the PCIE device B 506. The PCIE device A 502 is the receiver and the PCIE device B 506 is the transmitter on the second circuit 510. The PCIE device A is the transmitter along the third circuit 512 to the PCIE device B 506. The detection of the transmission along the second circuit 510 from the PCIE device B 506 to the CLKREQ# emulator 504 signals the PCIE device A 502 via the first circuit 508 to exit to a low power state, such as L1.1 or L1.2.

Figure 6:
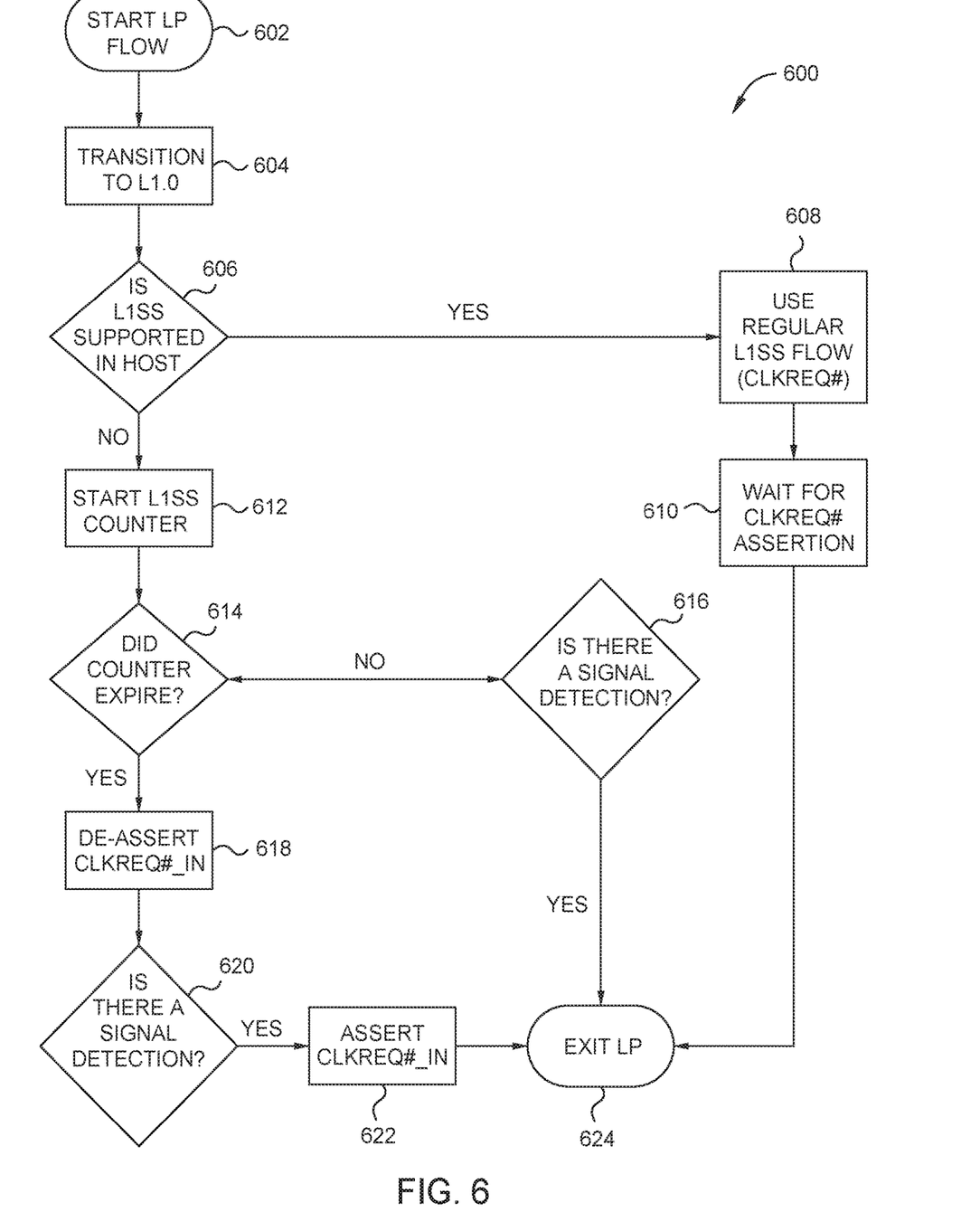
FIG. 6 depicts a flow diagram for L1 sub-state support, according to disclosed embodiments.

FIG. 6 depicts a flow diagram for L1 sub-state support, according to disclosed embodiments. The L1SS includes the lower power sub-states L1.1 and L1.2, where the device, such as the PCIE device A 502 of FIG. 5, has L1SS capability. At block 602, the low power flow is started, where the device is in a L0 state. The device is transitioned form the L0 state to the L1.0 state at block 604. At block 606, if the L1SS is supported by the host, such as the host 104 of FIG. 1, then the regular L1SS flow initiated utilizing the CLKREQ# emulator at block 608. At block 610, the PCIE MAC, such as the PCIE MAC 408, waits for the CLKREQ# assertion by the CLKREQ# emulator. The CLKREQ# assertion is a signal to exit the low power mode at block 624, such that the device exits the L1SS to the L1.0 state and returns to the L0 state.

However, if the L1SS is not supported by the host at block 606, then a L1SS counter starts at block 612. The L1SS counter counts to a predetermined amount of time (e.g., predetermined value) to allow for a low power transition request to be sent by the host. If the counter expires at block 614 and no signal detection was detected, then the CLKREQ#_in signal is de-asserted at block 618. By de-asserting the CLKREQ#_in signal at block 618, the device is transitioned to a L1SS. When a signal from the host is detected at block 620, the device asserts a CLKREQ#_in signal at block 622 to exit the L1SS and transition to the L0 state at block 624. Furthermore, if the counter expires at block 614 and a signal has been detected at block 616, then the PCIE MAC transitions the device out of the L1SS to the L0 state.

Figure 7:
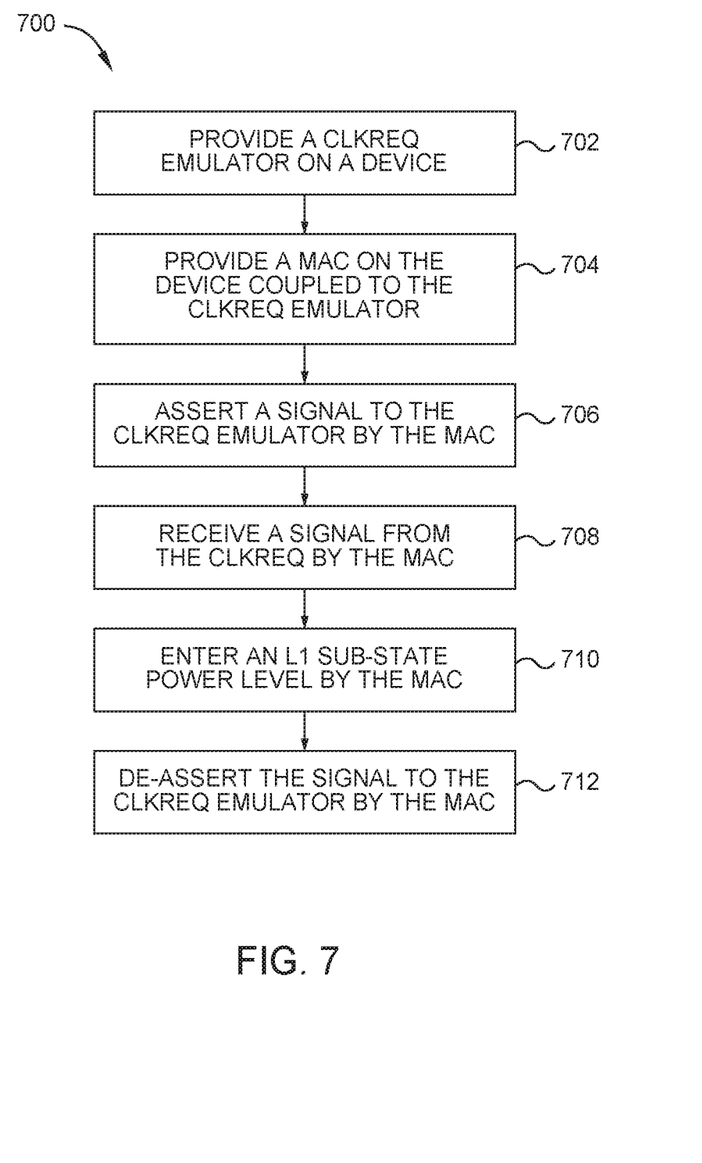
FIG. 7 depicts a method for entering an L1 sub-state in the presence of an L1 device, according to disclosed embodiments.

FIG. 7 depicts a method for entering an L1 sub-state in the presence of an L1 device, according to disclosed embodiments. At block 702, a CLKREQ emulator is included in the device. At block 704, a MAC, such as the PCIE MAC 408 of FIG. 4, coupled to the CLKREQ emulator is provided to the device. At block 706, a signal, such as the CLKREQ#_out signal 418, is asserted to the CLKREQ emulator by the MAC to indicate a transition to a L1SS. At block 708, a signal, such as the CLKREQ#_in signal 416, is received by the MAC from the CLKREQ emulator. At block 710, the MAC transitions the device to a L1SS. The CLKREQ emulator and the MAC both send a signal to the signal detect module of the PHY device. However, the CLKREQ emulator signal takes priority and keeps the signal detection module active for a request from the host to exit the L1SS. The CLKREQ#_out signal to the CLKREQ emulator is de-asserted by the MAC at block 712 when the device transitions to the L1SS.

Figure 8:
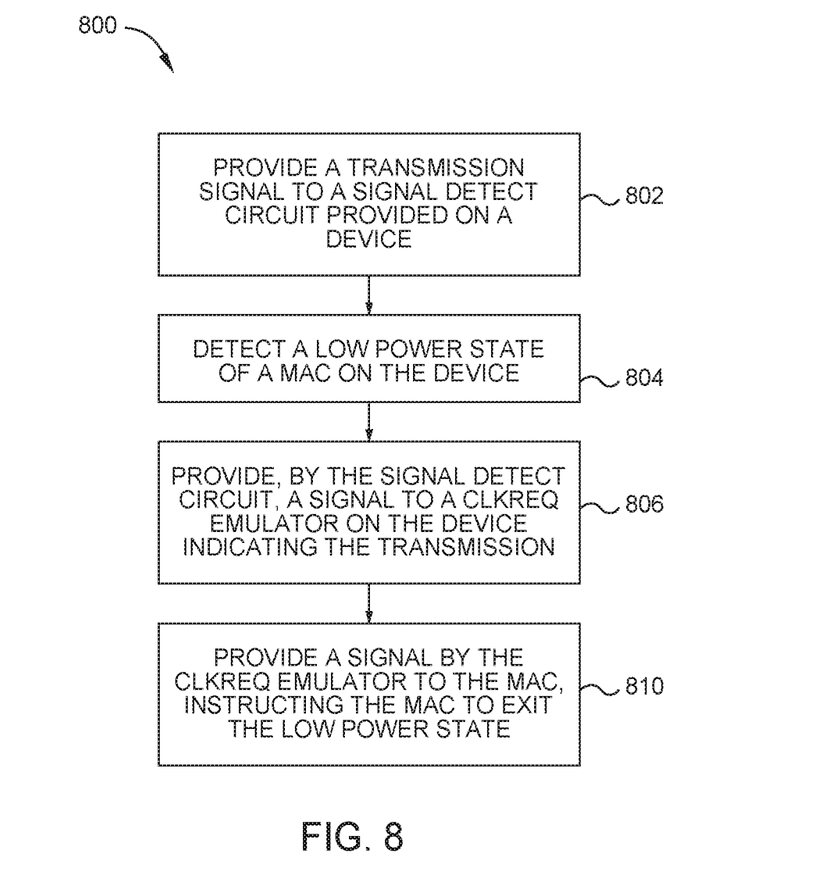
FIG. 8 depicts a method for exiting an L1 sub-state in the presence of L1 or device, according to disclosed embodiments.

FIG. 8 depicts a method for exiting an L1 sub-state in the presence of L1 or device, according to disclosed embodiments. At block 802, the host provides a transmission signal to the signal detect circuit included on the device. The signal detect identifies that the MAC is in a L1SS at block 804. The CLKREQ#_in signal is de-asserted by the CLKREQ emulator at block 806 due to the transmission of a request to exit the L1SS along the signal detect circuit. At block 810, the CLKREQ emulator sends a CLKREQ#_in signal to the MAC to transition the device out of a L1SS to the L0 state.

By including a CLKREQ emulator to the device, the low power sub-states, L1.1 and L1.2, can be supported. The L1.1 and the L1.2 states have a lower power consumption than the L1.0 state and has a faster response time than the low power states L2 and L3. Thus, the L1SS allows for a more robust device, while lowering power consumption during the low power mode.

In one embodiment, a data storage device including one or more memory devices, a CLKREQ emulator, a MAC coupled to the CLKREQ emulator, and a controller coupled to one or more memory devices. The controller is configured to cause the MAC to receive a signal from the CLKREQ emulator, cause the MAC to enter an L1 power sub-state, and cause the signal to the CLKREQ emulator from the MAC to be de-asserted.

The controller is further configured to cause the data storage device to enter an L1-sub-state power level. The data storage device further includes a PHY that includes a signal detect circuit coupled to the MAC configured to receive a disable signal from the MAC to disable the signal detect circuit. The disable signal is prevented from being provided to the PHY by via the CLKREQ emulator. The CLKREQ emulator comprises an L1 sub-state timer. The L1 sub-state timer is configured to be initiated upon the asserting the signal to the CLRREQ by the MAC. Receiving the signal from the CLKREQ emulator by the MAC of the controller configuration includes the CLKREQ emulator asserting a signal to the MAC by the CLKREQ emulator upon expiration of the L1 sub-state timer.

In another embodiment, a data storage device including one or more memory devices, a CLKREQ emulator, a MAC, a PHY that includes a signal detect circuit, and a controller coupled to one or more memory devices. The controller is configured to cause a signal to be asserted to the signal detect circuit, detect a low power state of the MAC, cause the signal detect circuit to assert a signal to the CLKREQ emulator, and cause the MAC to exit the lower power state, by causing the CLKREQ emulator to assert a signal to the MAC.

The CLKREQ emulator comprises and L1 sub-state timer. The signal to be asserted to the signal detect circuit is provided at one of prior to an expiration of the L1 sub-state timer and after the expiration of the L1 sub-state timer.

In another embodiment, a system for reducing power consumption in a device that includes a means for detecting a transmission to a PCIE device, a MAC on the PCIE device, coupled to the means for detecting a signal, and a means for determining a state of the PCIE device, coupled to the MAC, wherein the means for determining the state of the PCIE device instructs the MAC to enter a first low power state upon detecting no transmissions to the PCIE device after a period of time. The system further includes a CLKREQ coupled to the MAC, where the CLKREQ is configured to assert a signal to the MAC, and after the first low power state is entered, de-assert the signal to the MAC, where the MAC is configured to enter a second low power state upon de-assert of the signal.

The MAC is further configured to disable the means for detecting the transmission to the PCIE device. The CLKREQ is further configured to prevent the MAC from disabling the means for detecting the transmission to the PCIE device. The CLKREQ includes an L1 power sub-state timer. The L1 power sub-state timer is configured to cause the CLKREQ to assert the signal to the MAC. The means for detecting the transmission to the PCIE device is configured to provide a signal to the CLKREQ indicating receipt of a transmission signal. The means for detecting the transmission is further configured to detect a low power state of the MAC. The CLKREQ is configured to instruct the MAC to exit the low power state, upon detection of the transmission signal. The CLKREQ is further configured to instruct the MAC to exit the low power state, upon detection of the low power state of the MAC. The CLKREQ includes an L1 power sub-state timer configured to comprise an expiration, where the CLKREQ is configured to instruct the MAC to exit the low power state at one of before expiration of the L1 power sub-state timer and after expiration of the L1 power sub-state timer.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   one or more memory devices;
   a CLKREQ emulator;
   a MAC coupled to the CLKREQ emulator; and
   a controller coupled to the one or more memory devices, wherein the controller is configured to:
     cause the MAC to receive a signal from the CLKREQ emulator;
     cause the MAC to enter an L1 power sub-state; and
     cause the signal to the CLKREQ emulator from the MAC to be de-asserted.

2. The data storage device of claim 1, wherein the controller is further configured to cause the data storage device to enter an L1 sub-state power level.

3. The data storage device of claim 2 further comprising a PHY comprising a signal detect circuit coupled to the MAC configured to receive a disable signal from the MAC to disable the signal detect circuit.

4. The data storage device of claim 3 wherein the disable signal is prevented from being provided to the PHY by via the CLKREQ emulator.

5. The data storage device of claim 1 wherein the CLKREQ emulator comprises an L1 sub-state timer.

6. The data storage device of claim 5 wherein the L1 sub-state timer is configured to be initiated upon the asserting the signal to the CLKREQ by the MAC.

7. The data storage device of claim 6, wherein the receiving the signal from the CLKREQ emulator by the MAC of the controller configuration comprises the CLKREQ emulator asserting a signal to the MAC by the CLKREQ emulator upon expiration of the L1 sub-state timer.

8. A data storage device, comprising:
   one or more memory devices;
   a CLKREQ emulator;
   a MAC;
   a PHY comprising a signal detect circuit;
   a controller coupled to the one or more memory devices, wherein the controller is configured to:
     cause a signal to be asserted to the signal detect circuit;
     detect a low power state of the MAC;
     cause the signal detect circuit to assert a signal to the CLKREQ emulator;
     cause the MAC to exit the lower power state, by causing the CLKREQ emulator to assert a signal to the MAC.

9. The data storage device of claim 8 wherein the CLKREQ emulator comprises and L1 sub-state timer.

10. The data storage device of claim 9 wherein the signal to be asserted to the signal detect circuit is provided at one of prior to an expiration of the L1 sub-state timer and after the expiration of the L1 sub-state timer.

11. A system for reducing power consumption in a device comprising:
    a means for detecting a transmission to a PCIE device;
    a MAC on the PCIE device, coupled to the means for detecting a signal; and
    a means for determining a state of the PCIE device, coupled to the MAC, wherein the means for determining the state of the PCIE device instructs the MAC to enter a first low power state upon detecting no transmissions to the PCIE device after a period of time;
    a CLKREQ coupled to the MAC, the CLKREQ configured to assert a signal to the MAC, and after the first low power state is entered, de-assert the signal to the MAC;
    wherein the MAC is configured to enter a second low power state upon de-assert of the signal.

12. The system of claim 11 wherein the MAC is further configured to disable the means for detecting the transmission to the PCIE device.

13. The system of claim 12 wherein the CLKREQ is further configured to prevent the MAC from disabling the means for detecting the transmission to the PCIE device.

14. The system of claim 12 wherein the CLKREQ comprises an L1 power sub-state timer.

15. The system of claim 14 wherein the L1 power sub-state timer is configured to cause the CLKREQ to assert the signal to the MAC.

16. The system of claim 11 wherein the means for detecting the transmission to the PCIE device is configured to provide a signal to the CLKREQ indicating receipt of a transmission signal.

17. The system of claim 16 wherein the means for detecting the transmission is further configured to detect a low power state of the MAC.

18. The system of claim 17 wherein the CLKREQ is configured to instruct the MAC to exit the low power state, upon detection of the transmission signal.

19. The system of claim 18 wherein the CLKREQ is further configured to instruct the MAC to exit the low power state, upon detection of the low power state of the MAC.

20. The system of claim 19 wherein the CLKREQ comprises an L1 power sub-state timer configured to comprise an expiration, the wherein the CLKREQ is configured to instruct the MAC to exit the low power state at one of before expiration of the L1 power sub-state timer and after expiration of the L1 power sub-state timer.

* * * * *